United States Patent
Pohjonen et al.

[11] Patent Number: 5,129,777
[45] Date of Patent: Jul. 14, 1992

[54] LOAD HANDLING METHOD AND SYSTEM

[75] Inventors: Jukka Pohjonen, Helsinki; Pekka Heikkilä; Jouko Tolonen, both of Vantaa, all of Finland

[73] Assignee: Kone Oy, Finland

[21] Appl. No.: 630,806

[22] Filed: Dec. 24, 1990

Related U.S. Application Data

[63] Continuation of Ser. No. 298,198, Jan. 17, 1989, abandoned, which is a continuation of Ser. No. 68,088, Jun. 30, 1987, abandoned.

[30] Foreign Application Priority Data

Jun. 30, 1986 [FI] Finland ............... 862777

[51] Int. Cl.$^5$ .................................. B65G 1/04
[52] U.S. Cl. ...................... 414/280; 414/786; 414/661; 414/752; 414/225; 414/626; 414/627
[58] Field of Search ............ 414/752, 626, 627, 661, 414/786, 280, 281, 277, 267, 266, 225

[56] References Cited

U.S. PATENT DOCUMENTS

| 3,101,852 | 8/1963 | Pearne ................ 414/331 |
| 3,630,319 | 12/1971 | Peterson et al. ........ 414/661 X |
| 3,674,159 | 7/1972 | Lemelson ............. 414/276 |
| 3,750,804 | 8/1973 | Lemelson . |
| 3,762,531 | 10/1973 | Lee ................ 414/280 X |
| 3,782,565 | 1/1974 | Doran et al. ......... 414/281 X |
| 3,805,973 | 4/1974 | Thompson ............ 104/48 X |
| 3,820,667 | 6/1974 | Critchlow et al. ...... 414/752 X |
| 4,492,504 | 1/1985 | Hainsworth ........... 414/273 |
| 4,678,390 | 7/1987 | Bonneton et al. ...... 414/661 X |
| 4,789,295 | 12/1988 | Boucher, Jr. et al. .... 414/661 X |

FOREIGN PATENT DOCUMENTS

| 116126 | 8/1984 | European Pat. Off. . |
| 2600714 | 7/1976 | Fed. Rep. of Germany . |
| 3539115 | 5/1987 | Fed. Rep. of Germany ...... 414/277 |
| 41976 | 11/1974 | Japan . |

Primary Examiner—Frank E. Werner
Attorney, Agent, or Firm—Sughrue, Mion, Zinn, Macpeak & Seas

[57] ABSTRACT

A method of and system for handing a load by transferring a load between a storage base and a transport base by engaging a portion of at least one engagement member, e.g. a suction cup or an electromagnet, with an engagement surface on a side or end of the load, and displacing the engagement member to thereby pull the load onto the transport base for transport by the transport base or to push the load from the transport base onto the storage base. The engagement surface has a size at least equal to that of the portion of the engagement member.

9 Claims, 2 Drawing Sheets

LOAD HANDLING METHOD AND SYSTEM

This is a continuation of application Ser. No. 07/298,198 (Abandoned) filed Jan. 17, 1989, which is a continuation of application Ser. No. 07/068,088 (Abandoned) filed Jun. 30, 1989.

FIELD OF THE INVENTION

The present invention relates to a method of and apparatus for handling loads, by which a load may for example be moved from a storage base, on which the load is kept in storage, onto a transport base on which the load is moved about, or from a transport base onto a storage base.

DESCRIPTION OF THE PRIOR ART

Present practice in load handling in warehouses with shelves for example, is to use load handling equipment by which the load is moved onto a shelf or other storage base, or taken away therefrom, by means of telescopic forks which are pushed beneath the load or by belt or chain conveyors which are inserted beneath the load. Forks or conveyors entering under the load have the disadvantage that the shelves have to be made unnecessarily high because empty spaces must be left between the shelves and the load to allow for the load handling. Another drawback is slow operation owing to unnecessary motions, because the fork or conveyor must enter beneath the load prior to any load handling operation and, finally, the fork or conveyor has to be withdrawn from beneath the load.

Also at the present time, equipment is used in load handling which grips a rib or equivalent means provided on an end face or a side of the load. Unnecessary motions are thereby avoided, since the load handling equipment need not enter beneath the load. There is, however, the drawback that the manufacture of, for example, crates or boxes employed for this purpose is inconvenient owing to the provision of the ribs or equivalent means on the exterior of the crates or boxes. Moreover, the protruding ribs or equivalent means are an impediment to the stacking of the crates or boxes upon each other when empty.

BRIEF SUMMARY OF THE INVENTION

It is accordingly an object of the present invention to overcome the above-discussed disadvantages of the prior art.

According to the present invention, a method of handling a load comprises the steps of transferring a load between a storage base and a transport base by engaging a portion of at least one engagement member with an engagement surface on a side or end of the load, and displacing the engagement member to thereby pull the load onto the transport base for transport by the transport base or to push the load from the transport base onto the storage base, the engagement surface having a size at least equal to that of the portion of the engagement member.

Thus, no projections interfering, for instance, with the stacking of empty crates or boxes are needed on the load, and the load handling is fast because unnecessary motions are avoided, the handling taking place by action directed on the side or end of the load, not under the load.

The method may include employing a suction cup as the engagement member. When a suction cup is used, it is possible to use, standard storage boxes for the load, since it is possible to use the ends or sides of such boxes, as the engagement surfaces.

Preferably, the method includes displacing the suction cup into contact with the engagement surface, creating vacuum in the suction cup to secure the suction cup in engagement with the engagement surface, pulling the load by means of the suction cup from the storage base onto the transport base, releasing the vacuum from the suction cup, and displacing the suction cup out of contact with the engagement surface.

The suction cup can also be displaced into contact with the engagement surface and used to push the load means onto the storage base, after which the vacuum is released from the suction cup which is then displaced out of contact with the engagement surface.

Alternatively, an electromagnet may be employed as the engagement member, the engagement surface being magnetic. An electromagnet is well suited for example to transport metal crates and boxes. Moreover, electromagnets have the advantage of being relatively simple in construction.

The load can be pulled from the storage base onto the transport base by the electromagnet by displacing the electromagnet into contact with the magnetic engagement surface, energizing the electromagnet, whereby the electromagnet is secured to the engagement surface, pulling the load by means of the electromagnet from the storage base onto the transport base, de-energizing the electromagnet, and displacing the electromagnet out of contact with the engagement surface.

The load can also be pushed from the transport base onto the storage base by the electromagnet by directing the electromagnet into contact with the engagement surface, energizing the electromagnet, pushing the load by means of the electromagnet onto the storage base, de-energizing the electromagnet, and disengaging the electromagnet from contact with the engagement surface.

A conveyor may be employed as the transport base, the load being displaced relative to the conveyor by means of the conveyor. When using a conveyor as the transport base, space savings are obtained because use of the conveyor makes it possible to transport the load on the transport base to its ultimate location with the engagement member being needed only at the initial phase of load movement.

The transport base may be positioned higher than the storage base during movement of the load from the storage base onto the transport base or from the transport base onto the storage base, a combined pulling and lifting motion being employed during movement of the load from the storage base onto the transport base. The load handling will thus not be affected by inaccurate positioning because the transport base may be left either at the same level as the storage base or at a higher level.

According to another aspect of the invention, there is provided load handing system comprising a transport base for moving the load, an engagement unit for engaging the load, and rail means supporting the engagement unit for sliding movement, the engagement unit comprising at least one engagement member having a portion engageable with an engagement surface on a side or end of the load for pulling the load from the storage base onto the transport base or for pushing the load from the transport base onto the storage base, and the engagement surface having a size at least equal to the size of the portion of the engagement member.

The system may include at least two engagement units which may be suction cups or electromagnets.

In a preferred embodiment, the engagement unit comprises a pair of engagement members located at opposite ends of the engagement unit on an axis parallel to the direction of travel of the engagement unit on the rail means. It is thereby simple to manage, loads on opposite sides of a warehouse lane.

The engagement member is preferably self-aligning relative to the engagement surface to compensate for slight misalignments.

The transport base preferably comprises moveable conveyor means for displacing the load thereon.

BRIEF DESCRIPTION OF THE DRAWINGS

Further objects, features and advantages of the invention will be apparent to those skilled in the art from the following description thereof when taken in conjunction with the accompanying drawings, in which.

DESCRIPTION OF THE PREFERRED EMBODIMENT

The operation of the load management apparatus of the invention shall firstly be discussed with reference to FIG. 1.

Figure 1:
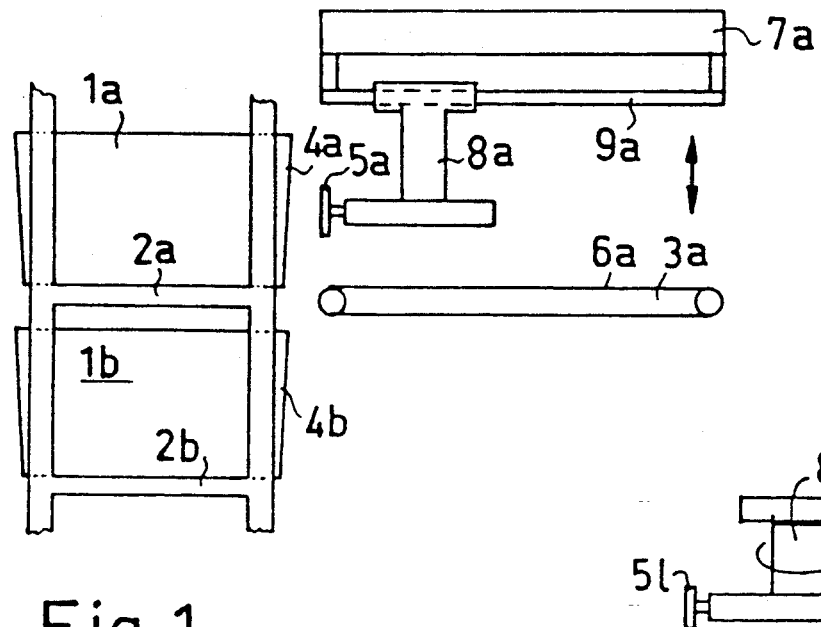
FIG. 1 shows a view in elevation of a load management means according to the invention and a storage shelf, with boxes, in elevational view.

In FIG. 1 there is depicted, in elevational view, a load management apparatus which is in the process of moving a box 1a from a storage shelf onto a conveyor 3a, by means of which the box 1a can be transported to any desired location in a storage area. As taught by the invention, the box 1a is pulled off the shelf 2a onto the belt 6a of the conveyor by means of a suction cup 5a, which is mounted on a slide 8a provided on an engagement unit 7a. The slide 8a runs on rails 9a. The engagement unit 7a and the conveyor 3a are mounted for example on an elevator by which they can be moved about and directed, in a manner known in the prior art, to come into register with the box 1a. Thereafter, the suction cup 5a is displaced, with the aid of the slide 8a, to contact the box 1a. A vacuum is then created in the suction cup 5a, by the aid of which the suction cup 5a engages an end face 4a of the box 1a, this end face serving the engagement surface.

Next, the box 1a is pulled off the shelf 2a onto the conveyor 3a. With a view to space economy, the box 1a is not pulled by the suction cup 1a all the way into position in the centre of the conveyor. Instead, the displacement of the load to the centre of the conveyor 3a is accomplished with the aid of the conveyor belt 6a and machinery driving this belt 6a. Prior to operating the conveyor 3a, the vacuum of the suction cup 5a has to be released and the suction cup moved out of the way of the box 1a. When the suction cup 1a is not used other than in the initial phase, savings can be made by reducing the width of the warehouse lane because the required width is then only the length of the conveyor 6a, not the combined lengths of conveyor 6a and the slide 8a.

When displacing the box 1a from the conveyor 6a onto the shelf 2a, the suction cup 5a is firstly displaced into contact with the box 1a and a vacuum is then created in the suction cup. The load is thereafter pushed onto the shelf 2a. In order to be able to manage with a warehouse lane of small width, the movement of the box 1a is commenced with the aid of the conveyor 6a, whereafter the box 1a is pushed into this ultimate position using the suction cup 5a. The vacuum is thereafter released and the suction cup 5a moved into another position.

Displacement of the other box 1b to and from the shelf 2b is accomplished in a similar manner by firstly moving the engagement unit 7a with its slide 8a down to the box 1b and by then making use of the end face 4b as an engagement surface.

When a suction cup 5a is used to move the load, the load may be for instance a common plastic or cardboard box. It is possible, with modern suction cups, to achieve high degrees of vacuum and therefore load engagement surfaces need not be perfectly smooth or even. There must merely be an accessible engagement surface the size of the suction cup is so that vacuum pressure will be maintained without rapid leakage. Instead of a single suction cup, several suction cups may be used when handling big loads.

If the suction cup 5a is one that aligns itself with the load, the engagement surfaces 4a and 4b need not themselves be perfectly aligned for engagement. A self-aligning suction cup may, for instance, be constructed with a pivot in the arm of the suction cup 5a. In that case, the suction cup 5a will align itself properly with the engagement surface so that the vacuum required for engagement of the load can be obtained.

It is often advantageous when moving the boxes 1a and 1b onto the conveyor 3a and onto the shelves 2a and 2b, or vice versa, to position the conveyor 3a to be slightly higher than shelves 2a or 2b, making the boxes 1a or 1b thereby easier to move. In this case, as the box 1a or 1b is being pulled from the respective shelf 2a or 2b, it is at the same time lifted with the aid of the suction cup 5a so as not to foul the edge of the conveyor 3a. It is also possible, in certain instances, to use another box or crate as a storage base and the placing of the box or crate upon another is then facilitated if the transport base is positioned somewhat higher than the box or crate serving as the storage base.

Figure 2:
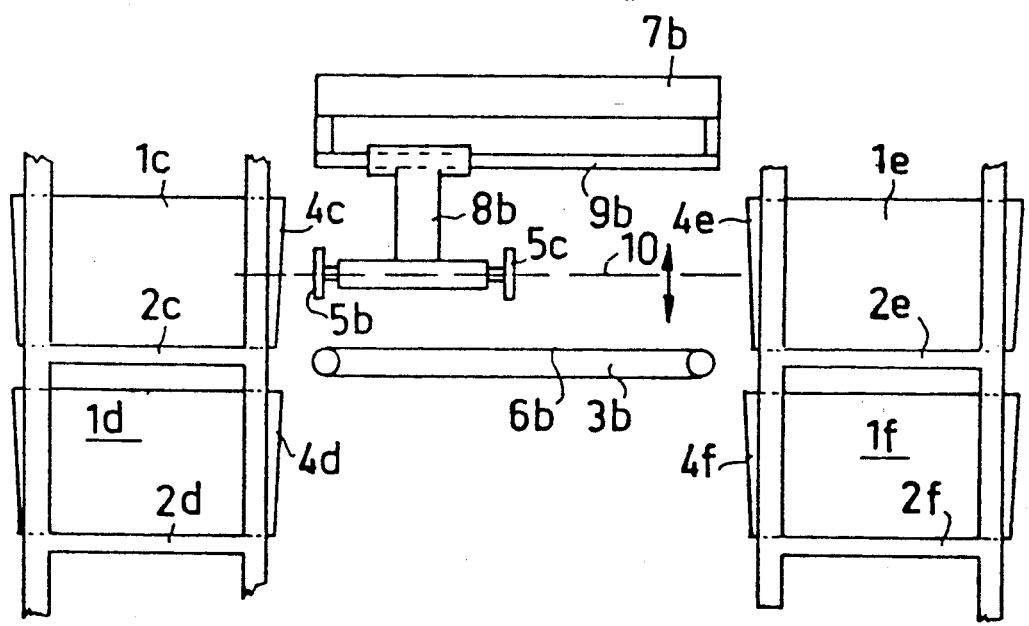
FIG. 2 shows a load management means according to the invention serving storage shelves on both sides of a warehouse lane.

In FIG. 2 there is depicted, in elevational view, a load handling apparatus according to the invention which enables loads at both sides of the warehouse lane to be handled by a single apparatus. Displacement of the boxes 1c-1f shown in FIG. 2 is accomplished by providing, on the slide 8b moving on rails 9b on the engagement unit 7b, an even number of suction cups 5b and 5c. These suction cups are located at opposite ends on shaft 10 parallel to the direction of travel of the slide 8b. Thus, as one suction cup 5b moves boxes 1c and 1d on one side of the lane onto shelves 2c and 2d from the conveyor 3b, or vice versa, the other suction cup 5c may move boxes 1e and 1f on the other side of the lane onto shelves 2e and 2f from the conveyor 3b, and vice versa, making use of the engagement surfaces 4e and 4f.

Figure 3:
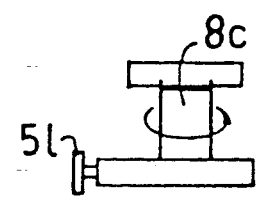
FIG. 3 shows a view in elevation of a turnable slide with suction cups.

In FIG. 3 there is shown yet another embodiment by which load handling is likewise accomplished on both sides of the lane. In FIG. 3 there is depicted a turnable slide 8c with one suction cup 51. The slide 8c may rotate in the horizontal plane, for instance with the aid of a pivot, so that the suction cup 51 is engageable with loads on opposite sides of the lane.

Figure 4A:
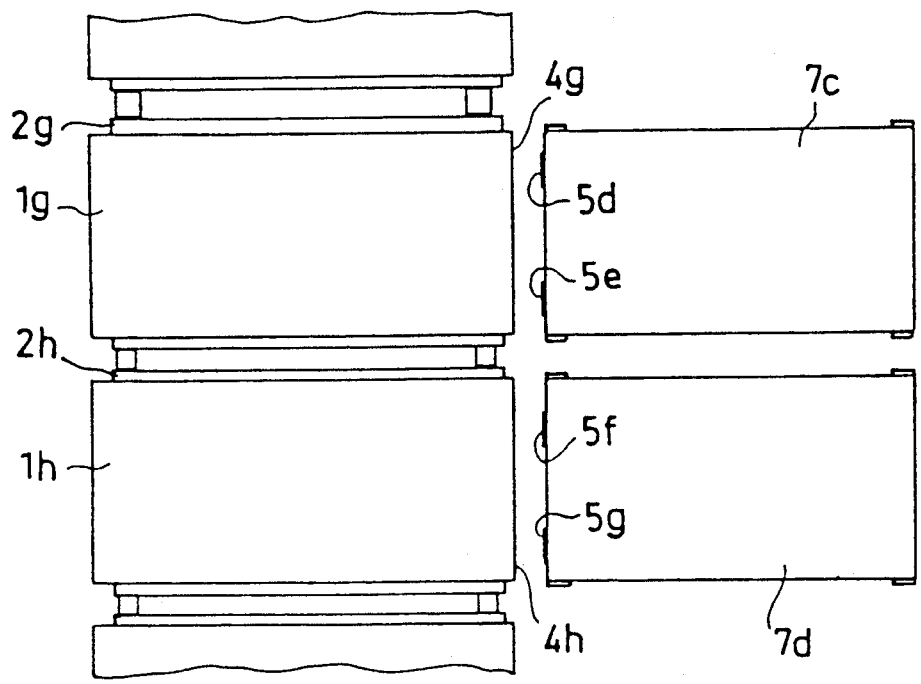
FIG. 4a shows a plan view of two load management units according to the invention and a storage shelf with boxes.
Figure 4B:
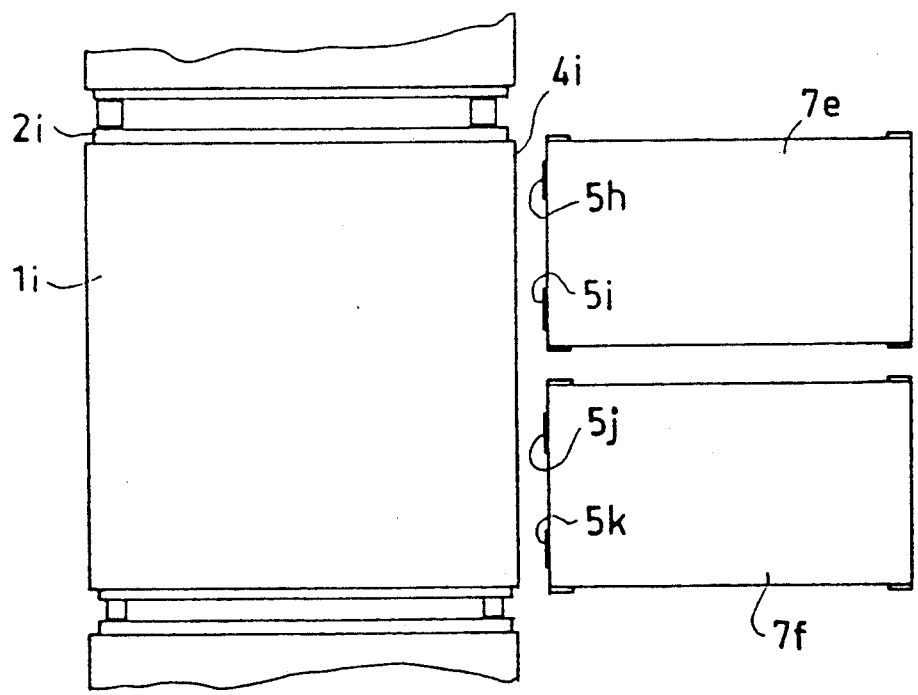
FIG. 4b a plan view of two load management units according to the invention, built for moving a single box, in top view.

In FIGS. 4a and 4b there is shown, in plan view, a load handling system employing two load engagement units 7c-7f. As shown in FIG. 4a, two suction cups 5d and 5e engage an end 4g of box 1g located on a shelf 2g constituting one storage base, and two suction cups 5f and 5g of the other unit engage with an end 4h of another box 1h located on a shelf 2h constituting another storage base.

Two suction cups 5h and 5i of the system shown in FIG. 4b engage an end 4i of box 1i on a shelf 2i. In FIG. 4b, suction cups 5j and 5k engage an end 4i of the same box 1i.

Thus, as depicted in FIG. 4a, each unit moves a separate box, while in FIG. 4b, both units engage and move the same box 1i. In this way, loads of various sizes may be moved by the same equipment by varying the number of engagement units used for transport.

Control of the present load handling system is accomplished with the aid of a programmable logic unit. The logic unit may, for instance, be employed to create vacuum in the suction cups or to release the vacuum present in the suction cups at the desired moment.

It will be apparent to persons skilled in the art that different embodiments of the invention are not exclusively confined to the examples presented in the foregoing. Rather they may vary within the scope of the claims following below. For instance, in the handling of machine pallets used for machine tool units, electromagnets may be used instead of suction cups, in which case the engagement surfaces on the sides or ends of the load must be of magnetic. The load is pulled from the storage base onto the transport base by electromagnets by displacing the electromagnets into contact with the magnetic engagement surfaces, energizing the electromagnets, to engage the engagement surfaces, pulling the load by means of the electromagnets from the storage base onto the transport base, de-energizing the electromagnets, and disengaging the electromagnets from the engagement surfaces. The load is pushed from the transport base onto the storage base in similar reverse fashion.

We claim:

1. A system for handling a load comprising:
   a storage base for storing a load, said storage base comprising a plurality of spaced apart opposed storage shelves;
   a transport base and an engagement unit vertically disposed in relation to each other and vertically displacable with respect to each other, and mounted on an elevator means which is vertically and laterally displacable to a predetermined position opposite a predetermined storage shelf of the storage base, said transport base being positioned in a plane higher than a plane of the storage shelves and including conveyor means thereon;
   at least two slide rail means depending from said engagement unit;
   at least one slide means depending from each of said slide rail means, said slide means adapted for horizontal movement thereof axially along a length of said slide rail means in a direction towards and away from said predetermined storage shelf;
   at least one engagement member depending from said at least one slide means, said engagement member being mounted by means of rotational mounting means on said engagement member and being adapted for rotational movement; and
   at least one engagement means disposed on said engagement member, said engagement means engagable with an engagement surface on said predetermined load whereby said load is lifted and pulled by the engagement means and combined with the conveyor means on the base the load is moved between said storage and transport bases and said transport and storage bases.

2. The system of claim 1 including an engagement member at opposite ends of said slide means on an axis parallel to the direction of travel of said slide means on said slide rail means, said engagement members facing in opposite directions away from one another for engaging loads on storage shelves located adjacent either end of said slide rail means without rotation of said engagement members.

3. The system of claim 1 wherein said at least two slide rail means are laterally spaced apart in a parallel relationship, each of said rail slide means movably supporting said slide means thereon with at least one said engagement member respectively connected to each said slide means.

4. The system of claim 1 wherein said engagement member is a suction cup engageable with said engagement surface by means of a vacuum.

5. The system of claim 1 wherein said engagement member is an electromagnet and said engagement surface is magnetic.

6. The system of claim 1 wherein said engagement member is self-aligning to conform to said engagement surface.

7. The system of claim 1 wherein said transport base conveyor means comprises a conveyor for displacing said load on endless conveyor belt means.

8. A method of handling a load, which comprises the steps of:
   supporting a rotatably mounted, non-extensible engagement member by means of a slidable support engaged on a slide rail member disposed on an engagement unit disposed above a transport base provided with a conveyor system;
   vertically and laterally displacing said transport base between spaced apart opposed storage shelves of a storage base for selective engagement with an engagement surface on an end of the load disposed on a respective one of said opposed storage shelves;
   positioning said transport base higher than said storage shelf for movement of the load from said storage shelf onto said transport base so that respective top surfaces of said transport base and storage shelf are not substantially aligned;
   engaging said load end with said engagement means;
   providing a combined pulling and lifting motion with said engagement means by axially displacing said rotatably mounted engagement member along said slide rail means thereby pulling the load from a respective storage shelf partially onto said conveyor system of said transport base;
   disengaging said engagement means and vertically displacing said engagement unit from said transport base;
   engaging said conveyor system to pull said load fully onto said conveyor system of said transport base;

vertically and laterally displacing said transport base and engagement unit to a predetermined location;

transferring said load from said transport base by engaging said conveyor system until said load is partially removed from said conveyor;

vertically displacing said engagement unit until said engagement means is even with the end of said load; and displacing said engagement member axially until said load resides in said predetermined location.

9. A method of handling a load as defined in claim 8, wherein said engagement member is rotated through substantially 180 degrees when loads are to be transferred to and from said opposed storage shelves.

* * * * *